TAPE TRANSPORT FOR AN INCREMENTAL TAPE RECORDER

Filed March 4, 1964 2 Sheets-Sheet 1

INVENTOR.
John R. Montgomery
BY
Blair & Buckles
ATTORNEYS.

TAPE TRANSPORT FOR AN INCREMENTAL TAPE RECORDER

Filed March 4, 1964 2 Sheets-Sheet 2

INVENTOR.
John R. Montgomery
BY
Blair & Buckles
ATTORNEYS.

United States Patent Office 3,370,283
Patented Feb. 20, 1968

3,370,283
TAPE TRANSPORT FOR AN INCREMENTAL TAPE RECORDER

John R. Montgomery, Trumbull, Conn., assignor to Wiltek, Inc., a corporation of Connecticut Filed Mar. 4, 1964, Ser. No. 349,350
6 Claims. (Cl. 340—174.1)

ABSTRACT OF THE DISCLOSURE

An incremental tape recorder is disclosed having a positive tape drive, preferably a sprocket wheel for engaging sprocket holes along both edges of a magnetic tape, with a magnetic transducer head positioned tangential to the tape drive wheel at the point at which driving force is applied to the tape. A low mass spring loaded pressure pad is mounted within an annular recess in the tape drive wheel to press the tape against the transducer at the tangential point of contact. A reversible stepping motor operates the drive wheel to move the tape by discrete increments in either direction. Movable tension sensing rollers positioned on either side of the tape drive wheel operate a pair of electrical switches to control the rates of tape feed and take-up, to maintain tape tension within predetermined limits.

*Background of the invention*

In prior art tape transports, the tape is typically moved past a read-write transducer by a capstan engaging the tape at a location in the tape path beyond the transducer. Thus, the tape is drawn past the transducer under tension. This arrangement has proven generally satisfactory in analog recording systems where the tape is moved continuously past the transducer and the incoming information is continuously impressed on the tape.

In digital systems, however, it is desirable that the individual information bits be impressed on the tape at uniformly spaced intervals and at precise locations relative to the tape length. When the incoming bits of information arrive at the transducer in uniformly spaced fashion there is no problem. When, however, and as is usually the case, the incoming bits arrive in random fashion, it is often necessary to provide additional means to ensure that the randomly arrived bits of information will be impressed upon the tape at uniformly spaced and precisely known locations. This can be done by driving the tape engaging capstan with a stepping motor and actuating the stepping motor only upon arrival of an incoming signal. In this way the tape is moved past the transducer in precisely metered and controlled increments so that the information bits are impressed upon the tape at uniformly spaced locations despite the randomness of the incoming signals. Such a system, because of the step-by-step manner in which the tape is advanced, is commonly known as an incremental tape recorder.

It is essential to the successful operation of such a system that the tape path length between the driving capstan and the transducer be maintained constant since variations in this path length will appear as variations in the spacing between successive information bits on the tape as well as in departures of any given bit from its desired position relative to the tape length.

It has been found in practice that such path length variations do occur. They occur because the tape is flexible and is continuously being alternately accelerated and decelerated. With each acceleration, the path tends to straighten and therefore shorten. With each deceleration, the tape tends to overrun itself so that the bowing of the path and therefore the path length is increased. Also, and even assuming a uniform path length, the volume of tape between the driving capstan and transducer will vary with variations in the tension of the tape resulting from the continual acceleration and deceleration. Further, lost motion (in the form, for example, of gear backlash or belt slippage) occurring in the drive to the capstan produces further errors in the spacing positioning of the successive information bits on the tape.

Incremental tape recorders as above-described are often used in place of paper tape punches for recording digital information, for example, in telegraphic communications systems, digital data collection and transmission systems, and the like. They can also be used in association with a typewriter to produce a machine language record of what is being typed. It would be desirable in most of these applications for the incremental recorder to be able to back space, that is to back up and correct an incorrectly recorded character. Prior art incremental tape recorders are incapable of back spacing for the above reasons and because their capstan drives are inherently subject to backlash.

Accordingly, it is an object of the present invention to provide an improved tape recorder.

It is a further object to provide an incremental tape recorder in which incoming random information is impressed on the tape at locations which are uniformly spaced along the tape.

It is a further object to provide an incremental tape recorder in which incoming random information is impressed on the tape at precise, known locations relative to the length of the tape.

A further object is to provide a tape recorder of the above character which is reversible; that is, in which the tape may be driven in either direction past the transducer.

A still further object of the invention is to provide an incremental tape recorder of the above character that is capable of back spacing.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which.

Figure 5:
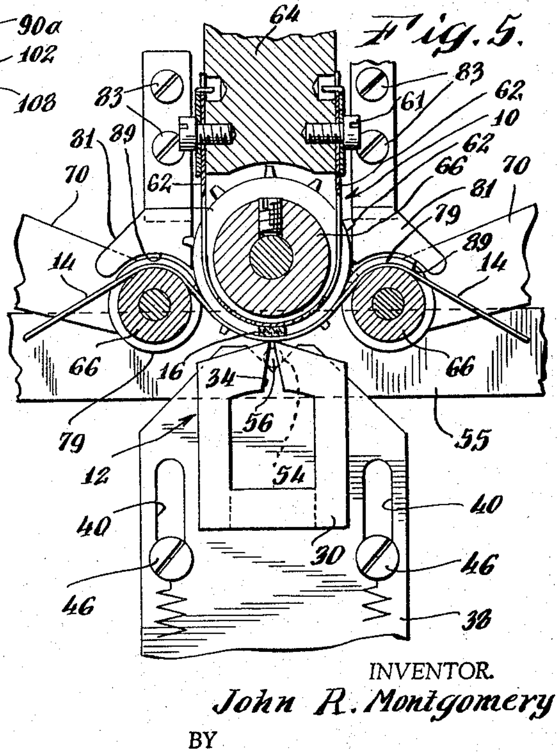
FIGURE 5 is a partial cross-sectional view taken along line 5—5 of FIGURE 4.

The tape recorder of the present invention, broadly considered, and as best seen in FIGURE 5, comprises a sprocket, indicated generally at 10, and a transducer indicated generally at 12. The transducer 12 is supported in a position where its working tip is adjacent the periphery of the sprocket 10 so that the sprocket may be rotated to move a sprocketed tape 14 past the tip of transducer 12. Since the point of driving the tape coincides with the point of recording or reproducing, the problem of variations in the path length between the driving and recording points is eliminated.

The tape 14 is maintained in intimate contact with the tip of the transducer 12 by a resiliently mounted pressure pad 16 received in a recess formed in sprocket 10.

The sprocket 10 is driven by a stepping motor 18 (FIG-

URE 4) whose output shaft 24 (FIGURE 4) is directly coupled to sprocket 10 to eliminate errors of bit positioning resulting from backlash or belt slippage. Motor 18 is reversible so that the tape may be recorded or read in either direction and back spaced to correct errors.

Figure 4:
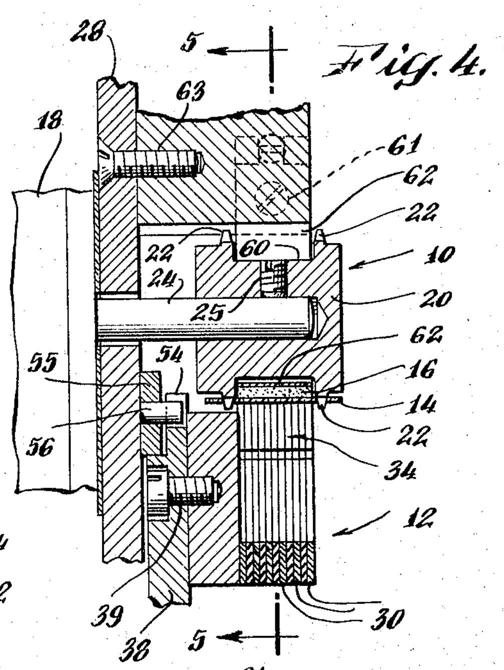
FIGURE 4 is a partial cross-sectional view taken along line 4—4 of FIGURE 1.

Referring now in detail to the drawings, and first to FIGURE 4, sprocket 10 comprises a body portion 20 and a set of teeth 22 arranged peripherally around the body portion adjacent each of its ends. Tape 14 has sprocket openings spaced along each side edge corresponding in pitch to that of the teeth sets 22 so that as the sprocket is rotated the teeth sets 22 engage the respective sprocket openings to drive the tape positively past the transducer 12. Sprocket 10 is rotated by a shaft 24 keyed to the sprocket by set screw 25. Shaft 24 is the output shaft of stepping motor 18 which is secured by bolts 27 (FIGURE 2) to the rear face of a mounting plate 28. Shaft 24 passes with a loose fit through plate 28 and is of a length to dispose the sprocket in a position spaced from the front face of plate 28.

In the disclosed embodiment and still referring to FIGURE 4, transducer 12 comprises a plurality of magnetic heads 30. Each head is provided with a suitable winding (not shown) and presents an air gap 34 (best seen in FIGURE 5). The heads 30 are laid one on top of another, with suitable insulation between adjacent heads, to form a laminated block 36. Block 36 is secured to the upper end of a slide 38 by a screw 39.

Figures 1, 2:
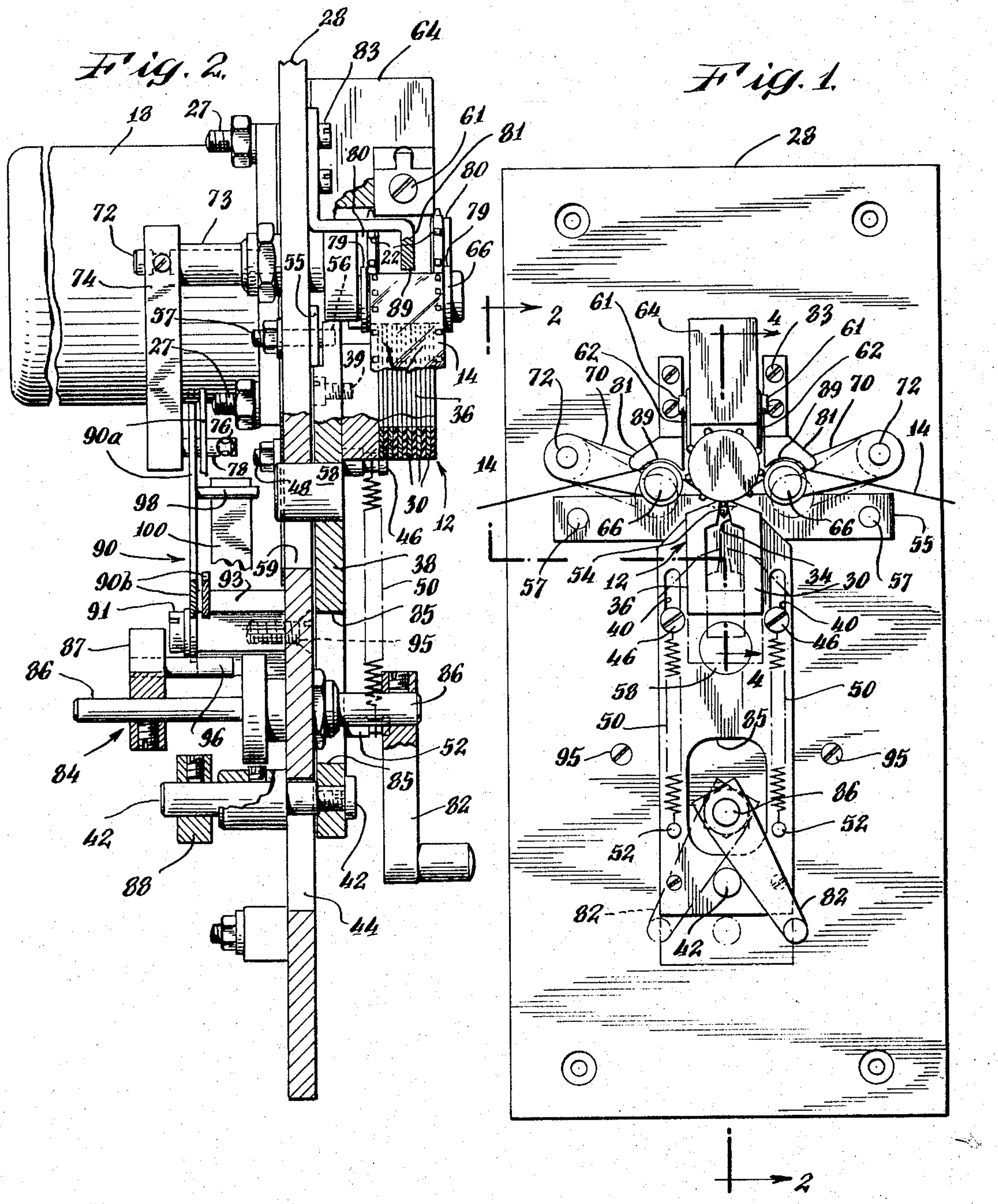
FIGURE 1 is a front view of an incremental tape recorder according to the present invention.
FIGURE 2 is a cross-sectional view on a larger scale looking from the left of FIGURE 1 and taken along line 2—2 of that figure.

Referring now to FIGURE 1, slide 38 has a pair of parallel vertically extending slots 40—40, one slot being provided on each side of block 36. Slide 38 carries adjacent its lower end a shaft 42 which projects rearwardly through a vertical slot 44 (FIGURE 2) in mounting plate 28. A pair of screws 46—46 are passed through slots 40—40 and screwed into mounting plate 28. Each screw 46 includes a smooth shank portion (not shown) which slidably engages the opposite vertical walls of the respective slot 40. Nuts 48 (FIGURE 2) are provided to lock screws 46 in position. A coil spring 50 extends between each screw 46 and one of a pair of posts 52 on plate 28. The upper end of slide 38 has a notch 54 which is adapted to coact with a pin 56 (see also FIGURES 4 and 5). Pin 56 is carried on a bar 55 secured as by screws 57 to the front face of plate 28.

Continuing to refer to FIGURE 2, slide 38 is also provided with a central pin 58 which is slidably received in a vertical slot 59 (FIGURES 2 and 3) in plate 28. Screws 46, shaft 42 and pin 58 thus coact respectively with slots 40, slot 44 and slot 59 to mount plate 38 for sliding vertical movement on plate 28 toward or away from sprocket 10. The pin 56 and notch 54 coact to determine the upper or working position of the slide 38. With the pin 56 received in notch 54, the upper ends of heads 30 defining the air gaps 34 are disposed at the path through which tape 14 is driven by sprocket 10 so that upon rotation of sprocket 10 tape 14 slides over the upper ends of heads 30. Springs 50 are under tension so that they hold slide 38 fixed at its working position during recording.

To insure intimate contact between the tape 14 and the heads 30 during a recording or reproducing operation, and as best seen in FIGURE 5, pad 16 is pressed resiliently downwardly against tape 14 from a position directly opposite the upper ends of heads 30. The tape is thus maintained in intimate contact with the heads 30 at the air gaps. Pad 16 may, for example, be comprised of a synthetic felt material. In order to accommodate pad 16, the body portion 20 of the sprocket is cut away between the two teeth sets 22 to provide an annular recess 60 (see also FIGURE 4). Pad 16 is secured to the lower end of a strip of spring material 62 that extends in U form through the annular recess 60 and is secured at its opposite ends as by screws 61 to opposite faces of a mounting block 64. Block 64 is secured to the front face of mounting plate 28 by screws 63 (FIGURE 4).

The spring strip 62 is of a shape and configuration such as, when relaxed, to dispose the pad 16 in a position radially beyond the tape path so that the strip 62 is normally buckled by the head 30 to press the pad resiliently against the heads. The springs 50 holding the heads 30 in their working position exert substantially more spring force than the buckled spring 62 that spring 62 cannot displace heads 30 downwardly out of their working position.

In order to quide tape 14 as it approaches and leaves sprocket 10 and in order to ensure that the tape will have a considerable wrap around the sprocket, a pair of spools 66—66 are provided. Each spool is rotatably mounted on the free end of a crank arm 70—70.

Referring now to FIGURE 2, crank arms 70—70 are keyed at their other ends to pivot shafts 72—72 mounted for rotation in shaft bushings 73—73 in plate 28. A crank arm 74 is keyed to the rear end of each shaft 72 and spring 76 (see also FIGURE 3) extends between posts 78 carried on the lower ends of crank arms 74. Spring 76 acts to resiliently press flanges 79—79 on spools 66—66 against cylindrical surfaces 80 provided at each end of sprocket 10 outside of the teeth sets 22.

As will be apparent from FIGURES 1 and 5, the tape 14, as it approaches the sprocket 10, passes over one of the spools 66, thereafter wrapping around sprocket 10 and thereafter passing over the other spool 66. In order to guide the tape in its movement around the spools and prevent displacement of the tape out of the path defined by the spools, a guide member 81 is provided for coaction with each spool. Each guide member 81 is secured at one end by screws 83 to the front face of mounting plate 28 and at its other or lower end presents an arcuate surface 89 overlying the related spool and spaced from and substantially concentric to the upper portion of the peripheral surface of that spool.

A handle 82 controls a mechanism 84 for releasing the tape 14 to allow its removal or replacement. The mechanism 84 includes a shaft 86 to which the handle 82 is keyed and which passes from the handle through an opening 85 in plate 38 and through a suitable bushing in plate 28, a cam plate 87 keyed to the rear end of a shaft 86, a cam plate 88 secured to the rear end of shaft 42, and a pair of bell cranks 90.

Figure 3:
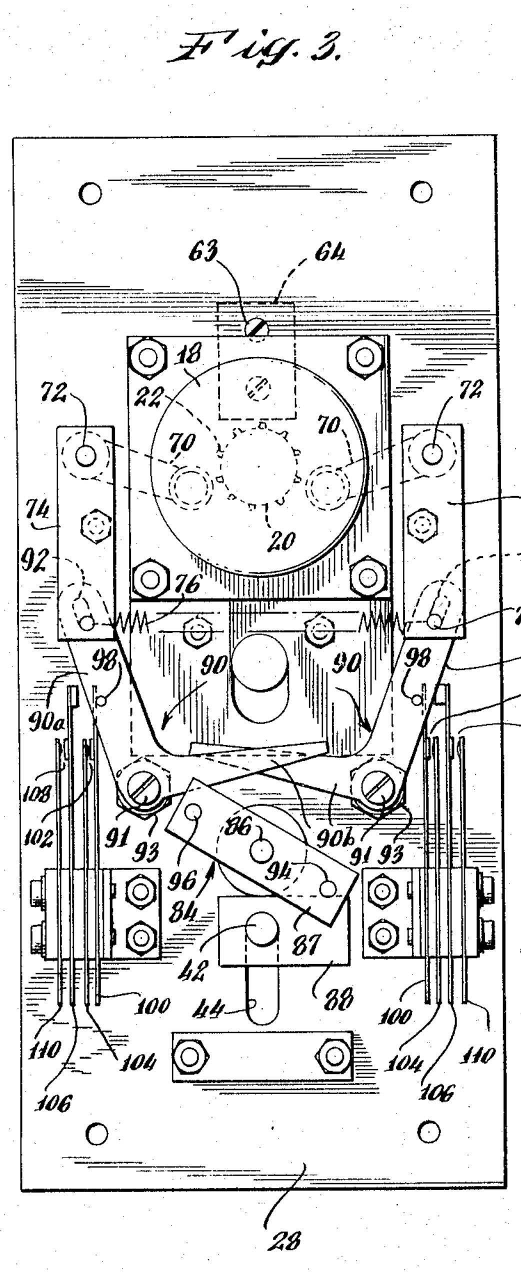
FIGURE 3 is a view looking from the rear of FIGURE 1.

Referring now to FIGURE 3 one arm **90*a* of each bell crank 90 is provided with a slot 92 which slidably receives post 78 on the related crank arm 74. The other arms 90*b*—90*b* of the bell cranks overlap each other. Bell cranks 90—90 are pivotally mounted by screws 91—91 threaded into spacers 93—93 secured to the rear face of plate 28 by screws 95—95** (FIGURE 2).

When it is desired to release the tape 14, the handle 82 is turned counterclockwise, as viewed in FIGURE 1, from its solid to its dotted line positions of that figure.

Referring again to FIGURE 3, turning of handle 82 rotates shaft 86 which in turn rotates cam plate 87. As cam plate 87 rotates, a pin 94 carried at one end of cam plate 87 engages cam plate 88 to push that plate together with slide 38 downwardly. Downward movement of slide 38 of course pulls the heads 30 downwardly away from sprocket 10 from their solid to their dotted line positions of FIGURE 1. Rotation of cam plate 87 also brings a pin 96 carried at its other end into engagement with the superimposed free ends **90*a*—90*a* of bell cranks 90—90, thereby pivoting the other ends of the bell cranks away from each other. This rotates crank arms 74—74 and shafts 72—72, thus pivoting crank arms 70—70 and spools 68—68 from their solid line positions of FIGURE 1 to their dotted line positions in which the spools 66—66 are clear of sprocket 10. With head 30 and spool 66 thus free of sprocket 10, tape 14** may be readily removed or replaced.

If the tension of the tape approaching or leaving the sprocket 10 exceeds a predetermined desired magnitude, as determined by the spring rate of spring 76, the spool 66 over which the affected portion of the tape is passing is pulled by the tension of the tape downwardly away from the sprocket. This downward movement of the affected spool 66 produces an outward movement of the related bell crank arm 90*a*. Referring again to FIGURE 3 each bell crank arm 90*a*—90*a* carries a pin 98—98. After a predetermined amount of outward movement of an arm 90*a*, its pin 98 engages a switch blade 100 to close contacts 102 carried by blade 100 and an adjacent blade 104. Closing of contacts 102 completes a circuit to a suitable control mechanism (not shown) which is thereby actuated in a direction and to an extent to relieve the excess tension condition. If this control mechanism is unable to correct the tension of the tape, the bell crank arm 90*a* continues its outward movement until the pin 98 engages a switch blade 106 to close contacts 108 carried by blade 106 and an adjacent blade 110. Closing of contact 108 completes a circuit to a suitable mechanism (not shown) which quickly brakes the entire mechanism to a halt.

The tape transport of the invention, as will be understood, is adapted to be operated in conjunction with a suitable data transmitter/receiver (not shown).

When the tape transport is operating as a recorder, the data transmitter/receiver transmits a data pulse to the heads 30. For each data pulse, the data transmitter also transmits a clock pulse to stepping motor 18. This clock pulse commands motor 18 to step to a new position so that the motor takes one step for each data pulse. The corresponding data and clock pulses are preferably so timed relative to each other that the heads 30 are energized to impress the character bits on the tape during the time that the tape is moving between successive positions.

The motor 18 may be, for example, a synchronous motor with a permanent magnet rotor and a polyphase winding. Such a motor is available from the Superior Electric Company, Bristol, Conn., under the trademark Slo-Syn 1002.

Since the sprocket 10 drives the tape right at the point of recording, the errors in the positions of the character bits on the tape, occurring in prior art devices as a result of variations of the path length between the driving and recording points and as a result of variations in the tension of the tape, are effectively eliminated. Further, since the motor is directly coupled to the tape drive mechanism (that is, the sprocket) the errors in bit positioning, occurring in prior art devices as a result of gear backlash or belt slippage are also eliminated. The tape transport of the present invention thus precisely positions the successive character bits on the tape.

Thus, the successive bits are precisely equal distances apart and each bit is at a precise, known location along the length of the tape.

When the tape transport is operating as a reproducer, the data transmitter/receiver commands the motor 18 to take a step. At the same time, the heads 30 are armed so that they read the character bits on the portion of the tape moved past the heads by the incremental movement of the motor. The information read by the heads is then fed to the receiver portion of the data transmitter/receiver.

Since motor 18 is reversible and since the point of driving is right at the point of recording or reading, the tape may be driven in either direction past the heads. Thus, for example, a piece of tape may be fed in one direction past the heads to record, and then fed in the other direction back past the heads to be read. If an erroneous character is recorded, the tape may be back spaced one character and the correct character recorded over the error.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. A magnetic tape transport for an incremental tape recorder comprising, in combination:

(A) a sprocketed drive wheel comprising
  (1) a cylindrical body portion,
  (2) a set of teeth arranged peripherally around said body portion at each of two axially spaced locations thereon, and
  (3) an annular recess within said body portion between said two teeth sets and coaxial with said cylindrical body;

(B) a magnetic recording head providing a magnetic gap at its tip;

(C) means of supporting said head in a position such that the said tip is disposed between said sprocketed wheel teeth sets, whereby tape having sprocket openings spaced along each side edge may be engaged by said teeth sets upon rotation of said drive wheel to record or read magnetic information on the tape;

(D) a pressure pad positioned within said annular recess in said sprocketed wheel at a location opposite the tip portion of said head; and (E) means continuously biasing said pad radially outwardly from the axis of said drive wheel, whereby to resiliently press the tape against said tip portion and maintain intimate contact therebetween at said gap.

2. A magnetic tape transport according to claim 1, wherein said biasing means comprises:

(A) a substantially rigid frame member positioned on the opposite side of said drive wheel from said magnetic recording head tip portion, and (B) a strip of spring material secured at its opposite ends to said frame member and extending through said annular recess in U form for supporting said resilient pad,
  (1) said spring strip carrying said pad on its outermost surface at a position adjacent to said magnetic head gap and being of a configuration when relaxed to disposed said pad radially beyond said tip portion so that said spring strip is normally buckled by said head to press said pad resiliently against said tip portion.

3. A tape transport for an incremental magnetic tape recorder comprising in combination:

(A) a rotary tape drive wheel adapted to engage a magnetic tape and to drive the tape along a path coincident at at least one point with the peripheral trace of said wheel,
  (1) a coaxial annular recess formed in said drive wheel between two peripheral tape engaging portions thereof,
  (2) means holding said tape in engagement with said drive wheel;

(B) a pressure pad resiliently mounted within said annular recess adjacent said one point and in spaced relation from said drive wheel and from the tape engaging portions thereof;

(C) an electromagnetic transducer having a tape engaging tip and mounted for movement between:
  (1) a working position adjacent said one point, to record or read information on said tape as the latter is moved along said path, and
  (2) an inactive position spaced from said point for removal or insertion of said tape,
    (a) stop means determining the working position of said transducer,
    (b) first spring means continuously biasing said transducer toward said working position; and (D) further spring means biasing said pressure pad toward said transducer from within said annular recess, (1) said further spring means imparting substantially less force to said pressure pad than said first spring means imparts to said transducer, whereby said pressure pad resiliently presses the tape against said transducer without displacing it from said working position.

4. A tape transport according to claim 3 including:

(A) a pair of individually movable tape guide spools disposed adjacent the periphery of said drive wheel at opposite sides of said tape engaging transducer tip and so positioned that the tape may pass over one of said guide spools, wrap partially around said drive wheel at said point opposite said transducer tip, and pass over the other guide spool;

(B) tension means mounting each of said spools for movement toward or away from said drive wheel in response to a variation from a predetermined desired value of tape tension in the portion of tape engaged thereby; and (C) electrical switch means connected with said spool mounting means and operable thereby upon such movement of either of said spools to actuate tape feed control mechanisms.

5. The combination of claim 4 wherein, (A) said electrical switch means includes separate switching elements for each of said spools; and (B) each of said switching elements includes:

(1) a first switch operated upon a predetermined amount of movement of its related spool to actuate a first control mechanism; and (2) a second switch operated upon a predetermined amount of further movement of said spool to actuate a second control mechanism.

6. In a tape transport for an incremental tape recorder, the combination comprising:

(A) a peripherally sprocketed tape drive wheel directly connected to the shaft of a reversible stepping motor, (B) a coaxial annular recess in the central portion of said drive wheel between the peripheral sprockets thereof, (C) spring loaded pressure means mounted within said annular recess and biased outward radially therefrom, and (D) a transducer head mounted in a plane tangential to the periphery of said drive wheel and extending into said recess between said sprockets into engagement with said pressure means.

References Cited

UNITED STATES PATENTS

| | | | |
|---|---|---|---|
| 2,542,590 | 2/1951 | Stone | 179—100.2 |
| 2,636,729 | 4/1953 | Smith | 226—38 |
| 2,686,845 | 8/1954 | Reed et al. | 179—100.2 |
| 2,866,855 | 12/1958 | La Forest. | |
| 3,045,884 | 7/1962 | Buhrendorf | 179—100.2 X |
| 3,050,225 | 8/1962 | Ulman. | |
| 3,137,427 | 6/1964 | Martin. | |
| 3,218,440 | 11/1965 | Albosta | 179—100.2 X |
| 3,233,958 | 2/1966 | Kaess et al. | 179—100.2 X |
| 3,235,265 | 2/1966 | Morrison et al. | 179—100.2 X |
| 3,234,666 | 2/1966 | Cooper | 179—100.2 X |

BERNARD KONICK, *Primary Examiner.*

L. G. KURLAND, R. J. GOUDEAU, *Assistant Examiners.*